(12) United States Patent
Kurth et al.

(10) Patent No.: US 10,187,132 B2
(45) Date of Patent: Jan. 22, 2019

(54) COMMUNICATION TERMINAL AND METHOD FOR SELECTING A TRANSMISSION ANTENNA

(71) Applicant: Intel IP Corporation, Santa Clara, CA (US)

(72) Inventors: Mathias Kurth, Dresden (DE); Jose A. Cesares Cano, Dresden (DE); Thomas Fliess, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 37 days.

(21) Appl. No.: 15/352,696

(22) Filed: Nov. 16, 2016

(65) Prior Publication Data

US 2017/0180024 A1    Jun. 22, 2017

(30) Foreign Application Priority Data

Dec. 16, 2015  (DE) .................. 10 2015 121 967

(51) Int. Cl.
*H04B 7/06* (2006.01)
*H04W 52/36* (2009.01)
*H04W 72/04* (2009.01)

(52) U.S. Cl.
CPC .......... *H04B 7/061* (2013.01); *H04W 52/365* (2013.01); *H04W 72/042* (2013.01); *H04W 72/0413* (2013.01)

(58) Field of Classification Search
CPC .... H04B 7/0602; H04B 7/0608; H04B 7/061; H04L 1/0625; H04W 52/00; H04W 52/08; H04W 52/365; H04W 52/367; H04W 72/0413; H04W 72/042
See application file for complete search history.

(56) References Cited

U.S. PATENT DOCUMENTS

| | | | | |
|---|---|---|---|---|
| 7,092,679 B2* | 8/2006 | Khorram | .................. | H04B 1/44 101/272 |
| 7,142,829 B2* | 11/2006 | Sung | .................... | H04B 7/0608 455/101 |
| 7,983,710 B2* | 7/2011 | Foschini | ............... | H04W 16/12 455/403 |
| 8,553,795 B2* | 10/2013 | Xu | ........................ | H04B 7/0613 375/267 |
| 8,730,922 B2* | 5/2014 | Hultell | ................. | H04B 7/0404 370/329 |
| 8,761,281 B2* | 6/2014 | Baldemair | ........... | H04B 7/0623 375/260 |
| 8,891,387 B2* | 11/2014 | Mohanty | .............. | H04B 7/0689 370/252 |
| 9,357,506 B2* | 5/2016 | Nukala | ............... | H04W 52/241 |

(Continued)

*Primary Examiner* — Eric Nowlin
(74) *Attorney, Agent, or Firm* — Schiff Hardin LLP

(57) ABSTRACT

According to an example, a communication terminal is described including a plurality of antennas, a transceiver configured to receive a message indicating a first antenna of the plurality of antennas that the communication terminal is to use as transmission antenna and a controller configured to determine whether a second antenna of the plurality of antennas has, according to a predetermined performance measure, a higher transmission performance than the first antenna and to control the transceiver to use the second antenna for transmission based on whether it has a higher transmission performance than the first antenna.

20 Claims, 7 Drawing Sheets

(56) References Cited

U.S. PATENT DOCUMENTS

| | | | |
|---|---|---|---|
| 9,379,788 B2* | 6/2016 | Clevorn | H04B 7/04 |
| 9,496,937 B1* | 11/2016 | Wang | H04B 7/0608 |
| 9,660,711 B2* | 5/2017 | Clevorn | H04B 7/04 |
| 9,735,828 B2* | 8/2017 | Zhang | H04B 1/40 |
| 9,775,122 B2* | 9/2017 | Siomina | H04W 56/0045 |
| 9,807,777 B2* | 10/2017 | Kim | H04L 1/1893 |
| 9,888,448 B2* | 2/2018 | Panchal | H04W 52/365 |
| 2005/0124300 A1* | 6/2005 | Khorram | H04B 1/44 |
| | | | 455/78 |
| 2005/0143024 A1* | 6/2005 | Sung | H04B 7/0608 |
| | | | 455/101 |
| 2008/0299981 A1* | 12/2008 | Foschini | H04W 16/12 |
| | | | 455/446 |
| 2010/0215111 A1* | 8/2010 | Filipovic | H04B 7/0608 |
| | | | 375/267 |
| 2010/0279621 A1* | 11/2010 | Brown | H04B 7/0628 |
| | | | 455/67.11 |
| 2010/0296591 A1* | 11/2010 | Xu | H04B 7/0613 |
| | | | 375/259 |
| 2011/0176593 A1* | 7/2011 | Hultell | H04B 7/0404 |
| | | | 375/224 |
| 2011/0286347 A1* | 11/2011 | Mohanty | H04B 7/0689 |
| | | | 370/252 |
| 2012/0027112 A1* | 2/2012 | Jiang | H04B 7/0404 |
| | | | 375/267 |
| 2012/0099666 A1* | 4/2012 | Baldemair | H04B 7/0623 |
| | | | 375/260 |
| 2013/0243064 A1* | 9/2013 | Wong | H04B 7/0691 |
| | | | 375/227 |
| 2013/0309981 A1* | 11/2013 | Ngai | H04B 7/0404 |
| | | | 455/78 |
| 2014/0233665 A1* | 8/2014 | Clevorn | H04B 7/04 |
| | | | 375/267 |
| 2015/0065188 A1* | 3/2015 | Nukala | H04W 52/241 |
| | | | 455/522 |
| 2015/0230206 A1* | 8/2015 | Tabet | H04W 72/02 |
| | | | 370/329 |
| 2015/0282196 A1* | 10/2015 | Kim | H04L 1/1893 |
| | | | 370/252 |
| 2016/0269086 A1* | 9/2016 | Clevorn | H04B 7/04 |
| 2017/0001003 A1* | 1/2017 | Pivonka | A61B 5/6871 |
| 2017/0006560 A1* | 1/2017 | Siomina | H04W 56/0045 |
| 2017/0016874 A1* | 1/2017 | Radjy | G01N 33/383 |
| 2017/0086201 A1* | 3/2017 | Nilsson | H04W 16/08 |
| 2017/0118727 A1* | 4/2017 | Panchal | H04W 52/365 |
| 2017/0180024 A1* | 6/2017 | Kurth | H04B 7/061 |
| 2017/0201289 A1* | 7/2017 | Zhang | H04B 1/40 |
| 2017/0201951 A1* | 7/2017 | Cheng | H04W 52/24 |
| 2017/0255854 A1* | 9/2017 | Bhatia | G06K 19/0775 |
| 2017/0273034 A1* | 9/2017 | Colombi | H04B 1/38 |
| 2017/0346521 A1* | 11/2017 | Chen | H04B 1/3838 |
| 2017/0373398 A1* | 12/2017 | Komulainen | H01Q 1/243 |
| 2018/0062718 A1* | 3/2018 | Clevorn | H04B 7/04 |

* cited by examiner

US 10,187,132 B2

COMMUNICATION TERMINAL AND METHOD FOR SELECTING A TRANSMISSION ANTENNA

TECHNICAL FIELD

Embodiments described herein generally relate to communication terminals and methods for selecting a transmission antenna.

BACKGROUND

Modern communication devices may include a plurality of antennas to support advanced communication technologies. For example, data may be received simultaneously via a plurality of antennas to achieve higher robustness and throughput. However, for transmission (i.e. sending), a lot of devices only use a single antenna such that one of the antennas needs to be selected as transmission antenna. For this, a network may use a closed loop transmit antenna selection (CL-TAS) scheme to request a communication terminal to use a certain antenna as transmission antenna. However, depending on the purpose of the application of the CL-TAS scheme by the network may request the communication terminal to use an antenna which is not the antenna with the best transmission performance from the point of view of the communication terminal. Accordingly, approaches to allow a communication terminal to use an optimal antenna as transmission antenna are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
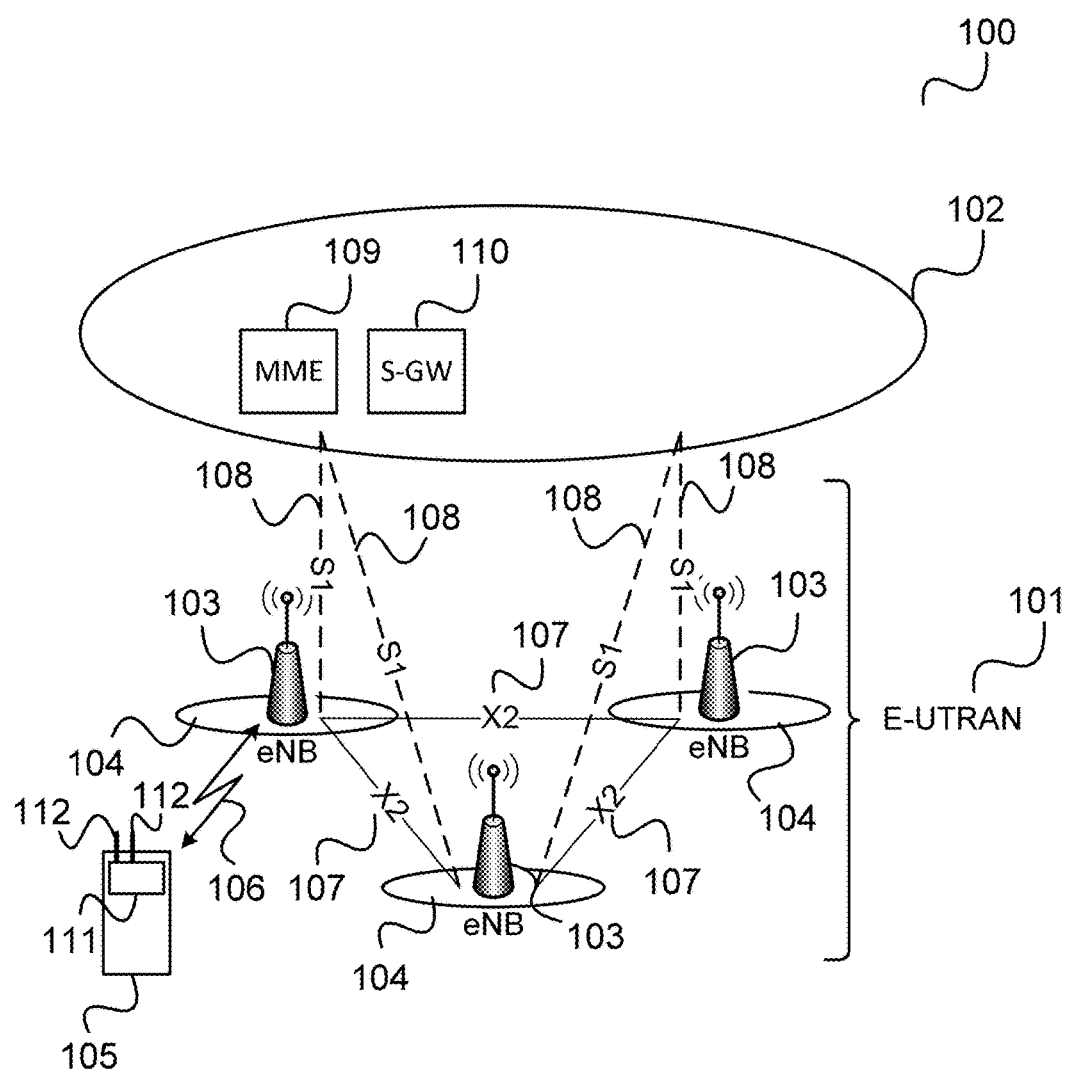
FIG. 1 shows a communication system, e.g. an LTE (Long Term Evolution) communication system.

FIG. 1 shows a communication system 100, e.g. an LTE (Long Term Evolution) communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network.

For radio communication via the air interface 106, the mobile terminal 105 includes a radio transceiver 111 and, in this example, multiple antennas 112.

The mobile terminal 105 (e.g. an LTE user equipment UE) may for example use the multiple antennas 112 for downlink reception. However, for cost and power consumption reasons, the UE 105 may be limited by hardware to a single RF transmission (TX) chain (e.g. of the transceiver 111) that can be time-multiplexed to only one of the available transmit antennas (which may for example be some or even all of the antennas 112). The network, e.g. the E-UTRAN 101 may deploy closed loop transmit antenna selection (CL-TAS) according to the 3GPP specification in order to control the UE 105 to utilize best the available TX antenna of its available TX antennas. Within closed loop (CL) TAS, the antenna port (AP) used by the UE 105 for the physical uplink shared channel (PUSCH) is selected by the network within the scrambling of the DCI0 (Downlink Control Information format 0) whereas the TX AP for sounding reference signals (SRS) alternates according to a pattern configured by the network semi-statically.

Other than for uplink capacity optimization, the network may deploy CL-TAS for another reason. The SRS transmissions on alternating UE TX APs can be used to obtain precise and up-to-date channel state information (CSI). Assuming channel reciprocity (which is typically valid in TD (Time Division)-LTE systems), the network can use the CSI within downlink beamforming in order to improve the downlink capacity. In fact, network vendors and operators may consider this use case as the main reason for deploying CL-TAS.

The term "partial implementation" of CL-TAS is in the following used to refer to a network deployment wherein CL-TAS is used (by the network side) for improving the downlink beamforming performance, whereas in such a deployment the TX AP is not adaptively scheduled for PUSCH based on channel conditions and TX power constraints. Within a voice call, the user may cover a large part of the UE with his hand and head. Thus, the performance of individual UE TX APs may be severely impaired due to shadowing effects. Modem vendors generally address this problem by proprietary TX antenna selection schemes. With a partial implementation of CL-TAS, it may occur that the UE is forced by the network to the worse TX AP due to the missing adaption on network side.

Figure 2:
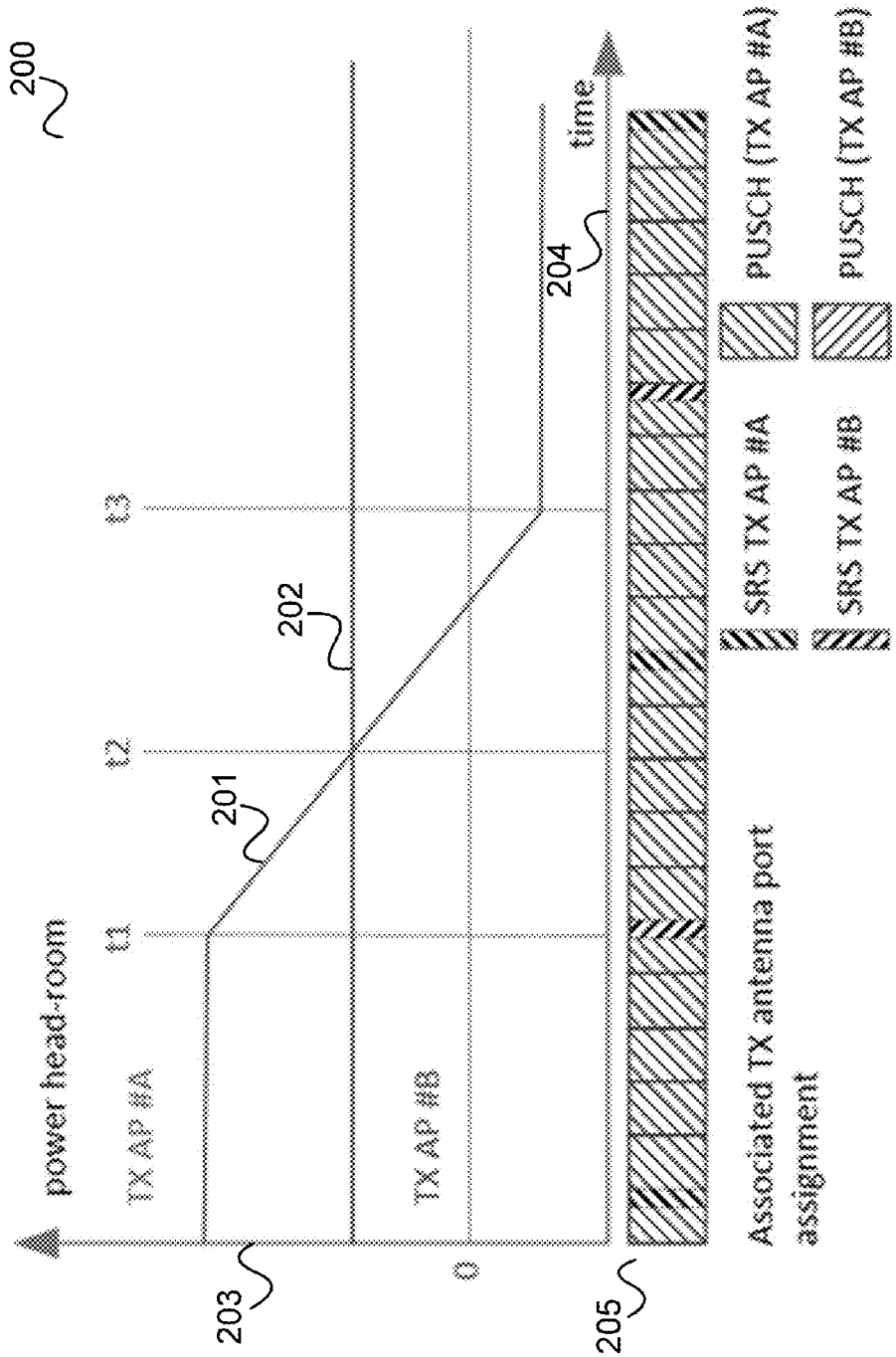
FIG. 2 shows an example of an antenna scheduling resulting from partial CL-TAS implementation under maximum uplink throughput conditions.

FIG. 2 shows an example of an antenna scheduling resulting from partial CL-TAS implementation under maximum uplink throughput conditions.

It is assumed that there are two available transmit antennas, a first antenna referred to as antenna #A and a second antenna referred to as antenna #B.

A first graph 201 shows the power headroom (increasing from bottom to top in accordance with the vertical axis 203) over time (increasing from left to right in accordance with the horizontal axis 204). In this example, at a time t1, the performance of the first antenna starts to degrade until it has reached its minimum performance at a time t3. For example the first antenna is being shadowed by the user. The second antenna has a constant performance as shown by a second graph 202.

An allocation diagram 205 shows the assignment of the antennas as transmit antenna, wherein a block having a rising diagonal hatching indicates that the first antenna is assigned as transmit antenna at the respective time and a block having a falling diagonal hatching indicates that the second antenna is assigned as transmit antenna at the respective time. Among the wider blocks which indicate the transmit antenna assignment for transmission of uplink data, e.g. for PUSCH (Physical Uplink Shared Channel) data transmission and PUCCH (Physical Uplink Control Channel) transmission, the allocation diagram 205 further includes smaller blocks indicating, by means of similar hatchings, which antenna is used for SRS (sounding reference signal) transmission at the respective time.

Each wider block in the allocation diagram 205 for example corresponds to a transmission time interval (TTI) according to the LTE frame structure, wherein, if there is a PUSCH transmission scheduled for a TTI without SRS transmission, the PUSCH is occupying the complete TTI while with an SRS transmission the PUSCH transmission is shortened by the duration of the SRS transmission.

In the example of FIG. 2, the network schedules TX AP A (i.e. the first antenna) as transmit antenna irrespective of the observed degradation. The consequences for the UE may be as follows:

The UE needs to increase the TX power, leading to a higher energy consumption.

In case the UE is already TX power limited, its uplink throughput has to be reduced to keep connectivity.

In the worst case, the UE loses the connectivity to the network.

Furthermore, in CL-TAS, the network may be adapt the UE TX AP according to received SRS power (instead of power headroom) when the maximum TX power is different among the UE TX APs (i.e. among the transmit antennas). This difference can arise due to AP specific P-MPR (power management maximum power reduction) settings as well as due to UE TX APs that are not compliant to 3GPP. According to network configurations obtained from the field, the SRS power is often 9 to 13 dB lower compared to a high-bandwidth PUSCH. Thus, the SRS transmission might not be TX power limited, whereas the following high-bandwidth PUSCH will be.

It should be noted that in the open loop (OL) TAS the TX AP selection for SRS is left to the UE implementation when OL-TAS is configured.

Generally, according to CL-TAS, it is implementation specific whether and how the network selects the UE TX AP for PUSCH. The following design choices exist:

1. The network schedules only a fixed TX AP similar to the default behavior when 3GPP TAS is not configured. This is illustrated by the example of FIG. 2.
2. The network schedules the TX AP based on received signal power from SRS as mentioned above. In that case, as mentioned above, imbalances in the maximum TX power per UE TX AP as well as AP specific P-MPR are not properly considered according to the network configurations obtained from the field. However, the maximum TX power might be AP specific due to the front-end design. Furthermore, the P-MPR might be AP specific due to specific absorption rate (SAR) regulations in order to reduce the radiated power on the antenna that is closer to the users head.
3. The network schedules the TX AP based on PH (power headroom) reports.

In the following, an approach is described in which the UE detects whether the network has deployed a partial implementation of CL-TAS. In this case, the UE may overrule the CL-TAS network decision based on a long-term best TX AP estimated at UE side.

According to various examples, the UE estimates the best TX AP based on the power head-room (PH) which includes the path-loss as well as TX power limitations. For the decision whether the UE overrules the CL-TAS network selection, according to an example as described below, a metric is introduced that includes both the imbalance of PH between TX APs as well as the scheduling decision of the network. The metric is filtered (i.e. includes a filtering over time, e.g. an (possibly weighted) averaging of past values representing antenna performance) in order to reveal the long-term behavior. When the metric exceeds a predefined threshold, the UE does not follow the TX AP signaled in the DCI0, but for example inverts the DCI0 information (e.g. in case of two antennas, uses the other one than the one that has been signaled by the DCI0 information). This way, the UE can ensure that it uses the long-term best TX antenna regardless of the network implementation of CL-TAS.

In the following, an example of the approach where the UE may overrule the network decision (i.e. the transmit antenna assignment given by the network) is described in more detail based on a communication system architecture as illustrated in FIG. 1.

It is assumed that the two TX APs are deployed in the UE RF front-end, i.e. two of the antennas 112 can be used as transmit antenna, wherein the UE 105 can use only one of them at a time for transmission. It is further assumed that the UE 105 supports TAS (e.g. according to 3GPP) and that the network (e.g. E-UTRAN 101) has enabled CL-TAS.

As described above, without overruling of network decisions by the UE 105, a behavior as shown in FIG. 2 may occur: the network is selecting TX AP #A for all PUSCH transmissions even though between t1 and t3, the PH (power headroom) on TX AP #A reduces due to a path-loss increase, e.g. the user is shadowing the respective antenna. TX AP #B is not affected in this example and the hypothetical PH on AP #B remains constant.

From t2 onwards, the hypothetical PH on TX AP #B would be larger than the actual PH on AP #A. Since the network is not controlling the UE TX AP based on PH, the UE is forced to the worse AP. This may, without degradation, result in:

Higher TX power: Higher consumption of battery power and, thus, a shorter device life time.

Uplink throughput degradation: when the UE 105 is already TX power limited, the uplink throughput has to be reduced to keep connectivity.

Link loss: the UE 105 may lose the connectivity to the network 101 when both TX power and link adaptation are not able to outweigh the path-loss increase on the respective AP.

To avoid this, according to the present example, the UE 105 is configured to detect a partial CL-TAS implementation. It ensures that the long-term best TX antenna is used regardless of the network implementation of CL-TAS.

According to the 3GPP standard, when CL-TAS is enabled, the UE 105 is to apply the TX AP (i.e. the transmit antenna) that is indicated in the most recent DCI0 the UE 105 has received. It is left to the network vendor how the UE TX AP is selected. Depending on the design choices as described above, the UE 105 may suffer from reduced battery life time, UL throughput degradations and link losses. It can be seen that design choice 1 as described above (fixed TX AP) may lead to these impairments, however, also design choice 2 as described above (SRS based TX AP selection) may be affected for the following reasons:

The second antenna (in a scenario as in the example of FIG. 2) may not be compliant to the 3GPP power class 3 in a way that its maximum TX power is lower than, e.g. 23 dBm. This may for example be the case for the front-end of a tier 1 UE vendor with a high market share.

The P-MPR contributions may be different on both antennas. Due to SAR regulations, the antenna closer to the users head might receive a higher power reduction.

According to network configurations obtained from the field, the SRS power is often 9 to 13 dB lower compared to a high-bandwidth PUSCH. Thus, the SRS transmission might not be TX power limited, whereas the following high-bandwidth PUSCH will be.

Figure 3:
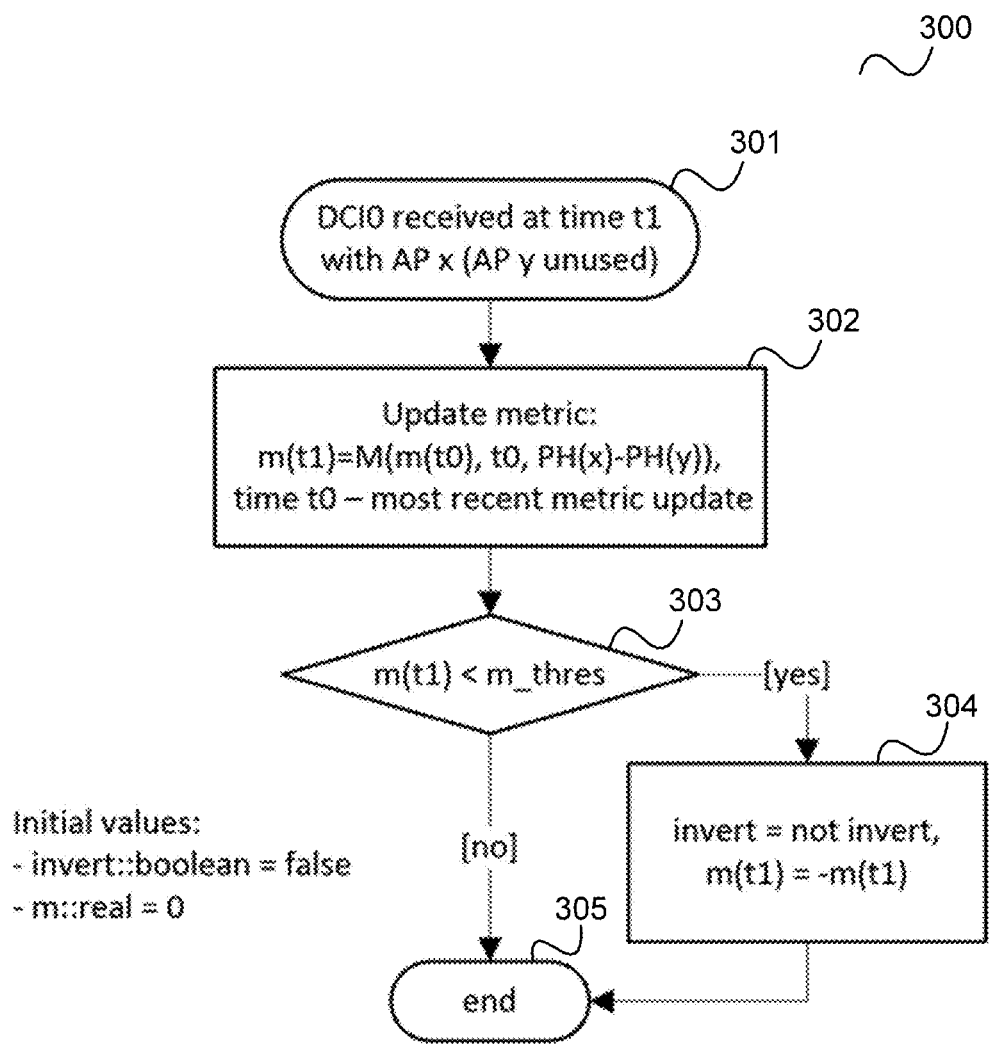
FIG. 3 shows a flow diagram illustrating a metric update and a overrule decision by the UE on reception of a DCI0 when CL-TAS is configured.

FIG. 3 shows a flow diagram illustrating a metric update and a overrule decision by the UE on reception of a DCI0 when CL-TAS is configured.

In 301, at a time t1, the UE 105 receives a DCI0 indicating TX AP x for PUSCH transmission. The remaining TX AP is referred to as y in the following.

In 302, the UE 105 updates the overrule decision metric m to its value m(t1) at for time t1 according to $$m(t1)=M(m(t0),t0,PH(x)-PH(y))$$

wherein m(t0) is the value of the metric after the most recent metric update at time t0<t1, PH(x)−PH(y) is the power headroom difference between the used and the unused TX AP. A positive value indicates that the currently used TX AP offers more power head-room.

The filter function M removes short-term variations. The function M filters both short-term variations in the PH as well as in the network TX AP selection. An implementation of M could be a (IIR) filter (e.g. the layer 3 filter according to the 3GPP) with a long filter delay to ensure a response time of several hundreds of milliseconds.

In 303, the UE 105 compares the metric value m(t1) with a predetermined threshold m_thres (which may be chosen as zero without hysteresis or different from zero to implement a hysteresis). If m(t1)<m_thres, then the UE 105 sets, in 304, the overrule bit invert to "true" (i.e., assuming the initial value is "false", negates it). Furthermore, the UE 105 negates the value of the metric m(t1). The process then ends in 305.

For example, the power headroom is measured in dB relative to maximum TX power and a threshold m_thres of −3 dB may be used as a typical 'low' threshold (i.e. for an aggressive design). A more conservative value for the threshold m_thres may for example be −6 dB or −9 dB.

Otherwise, the invert bit and the metric value are kept unchanged and the process ends in 305.

When the overrule invert bit is set to false after the process of FIG. 3, the UE 105 uses the transmit antenna as indicated in the DCI0, i.e. follows the DCI0.

When the overrule invert bit is set to true, the UE uses the other one of the transmit antennas for PUSCH transmission than the on signaled by the network in the DCI0. In particular, when the network is signaling TX AP #A (i.e. if x corresponds to A), the UE uses #B (corresponding to y in this case) and vice versa.

The mobile terminal 105 may keep the SRS transmission on the network-configured TX APs in order to prevent oscillations.

The filter delay of the filter function M as well as the threshold m_thres may be selected according to the desired response time and hysteresis.

Figure 4:
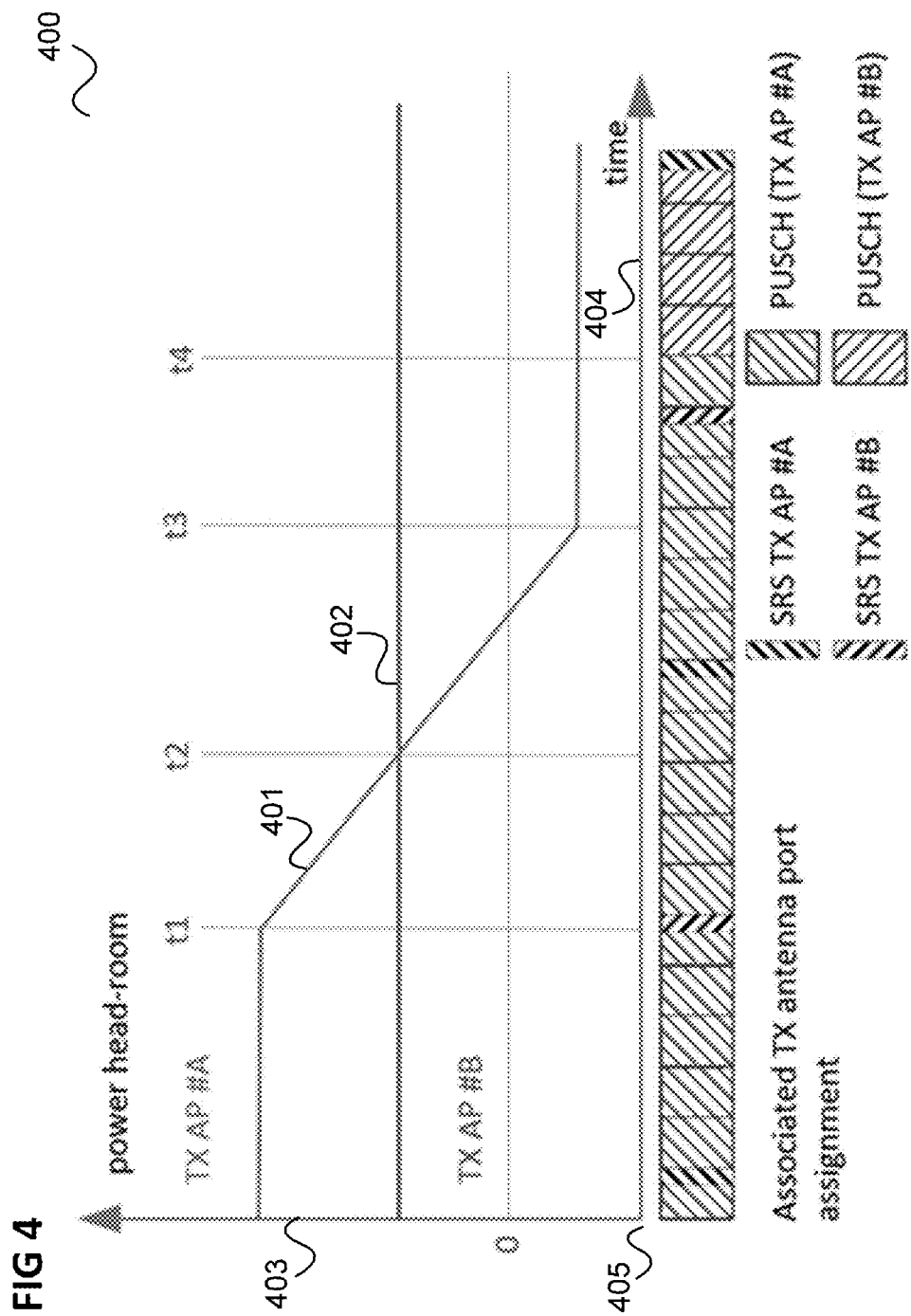
FIG. 4 illustrates the behavior of the communication terminal when applying the procedure of FIG. 3.

FIG. 4 illustrates the behavior of the communication terminal when applying the procedure of FIG. 3.

As in the example of FIG. 2 a first graph 401 shows the power headroom (increasing from bottom to top in accordance with the vertical axis 403) over time (increasing from left to right in accordance with the horizontal axis 404) and at a time t1 the performance of the first antenna (antenna port #A) starts to degrade until it has reached its minimum performance at a time t3 (e.g. due to being shadowed by the user) while the second antenna (antenna port #B) has a constant performance, shown by a second graph 402.

Further, similarly to FIG. 2, an allocation diagram 405 shows the assignment of the antennas as transmit antenna, wherein a block having rising diagonal hatching indicates that the first antenna is assigned as transmit antenna at the respective time and a block having falling diagonal hatching indicates that the second antenna is assigned as transmit antenna at the respective time. Among the wider blocks which indicate the transmit antenna assignment, the allocation diagram 405 further includes smaller blocks indicating, by means of similar hatchings, which antenna is used for SRS (sounding reference signal) transmission at the respective time.

It is assumed that at a time t4, the filtered metric falls below the threshold m_thres. Accordingly, the mobile terminal 105 selects the second antenna (TX AP #B) at the time t4.

Figure 5:
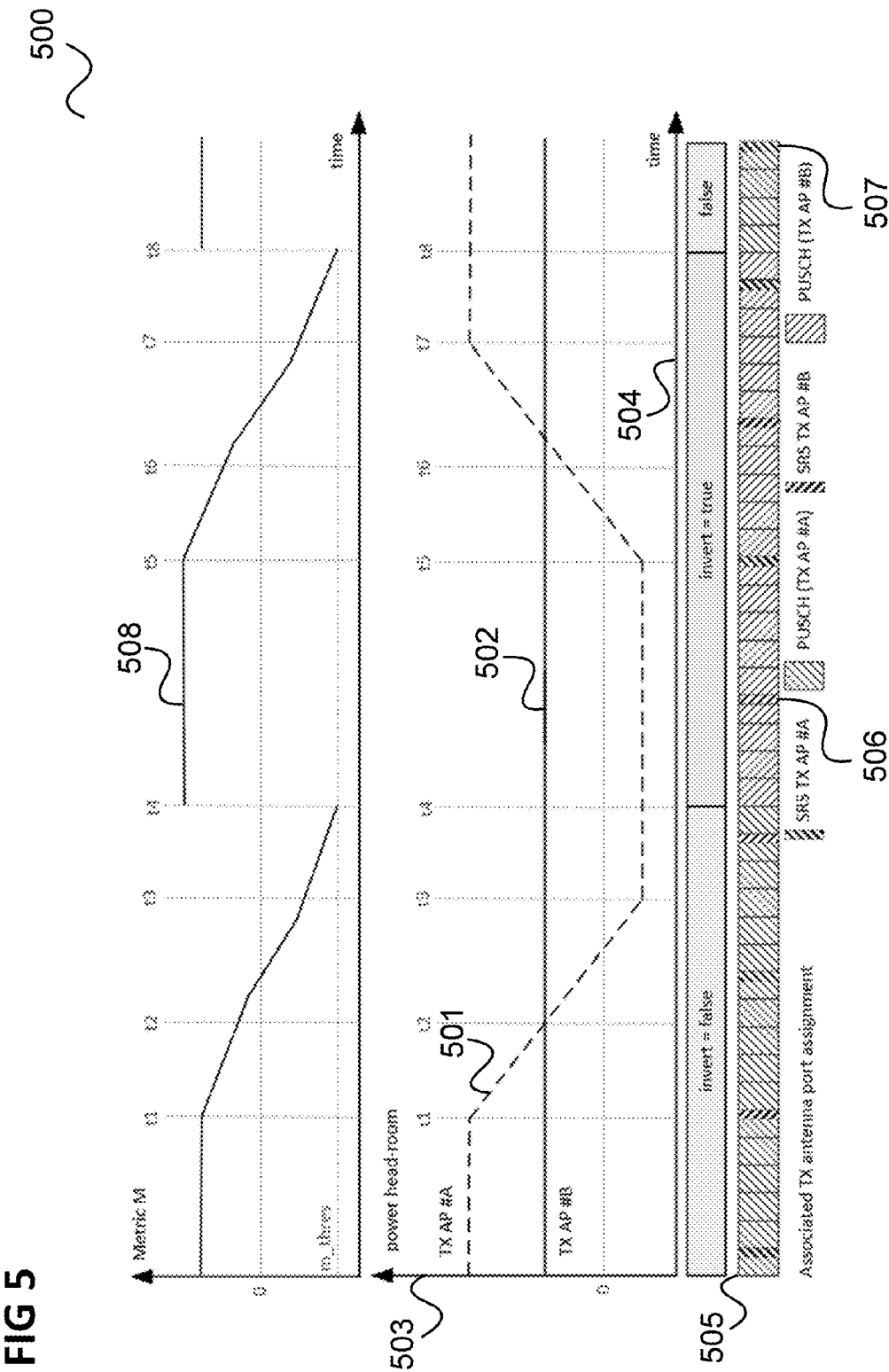
FIG. 5 illustrates the behavior of the communication terminal when applying the procedure of FIG. 3 with an additional swapping of the antenna used for transmission of SRS.

FIG. 5 illustrates the behavior of the communication terminal when applying the procedure of FIG. 3 with an additional swapping of the antenna used for transmission of SRS.

As in the example of FIG. 4 a first graph 501 shows the power headroom (increasing from bottom to top in accordance with the vertical axis 503) over time (increasing from left to right in accordance with the horizontal axis 504) and at a time t1 the performance of the first antenna (antenna port #A) starts to degrade until it has reached its minimum performance at a time t3 while the second antenna (antenna port #B) has a constant performance, shown by a second graph 502.

Starting at a time t5, the first antenna improves and reaches maximum performance at a time t7.

Further, similarly to FIG. 2, an allocation diagram 505 shows the assignment of the antennas as transmit antenna, wherein a block having rising diagonal hatching indicates that the first antenna is assigned as transmit antenna at the respective time and a block having falling diagonal hatching indicates that the second antenna is assigned as transmit antenna at the respective time. Among the wider blocks which indicate the transmit antenna assignment (e.g. for PUSCH transmission), the allocation diagram 505 further includes smaller blocks indicating, by means of similar hatchings, which antenna is used for SRS (sounding reference signal) transmission at the respective time.

Further, a third graph 508 (in an additional diagram) shows the behavior of the metric corresponding the power headrooms illustrated by the graphs 501, 502 (based on the same timescale, i.e. as given by the horizontal axis 504).

It is assumed that at the time t4, the filtered metric falls below the threshold m_thres. Accordingly, the mobile terminal 105 selects the second antenna (TX AP #B) at the time t4.

Further, it is assumed that at time t8, since the power headroom of the first antenna has increased, the filtered metric again falls below the threshold m_thres such that the mobile terminal 105 returns to using the first antenna at time t8.

Further, in this example, when switching the antenna used for transmission, the mobile terminal 105 also switches the antenna used for SRS reporting. Specifically, the mobile terminal 105 performs the SRS reporting 506 after time t4 with the second antenna (although it would be the first antenna's turn according to the alternation) and continues in alternating manner until it performs the SRS reporting 507 after time t8 with the first antenna (although it would be the second antenna's turn according to the alternation).

Reasons to swap the antenna for the SRS transmission together with the antenna for the PUSCH/PUCCH transmission as in the example of FIG. 5 may for example be:
  the TX AP relationship between SRS transmission and PUCCH/PUSCH transmission remains: By observing the received quality of SRS, the eNodeB might deduce the quality of the PUSCH/PUCCH.
  this approach may be easily implemented in the UE.

Reasons to not swap the antenna for the SRS transmission together with the antenna for the PUSCH/PUCCH transmission (i.e. keep the SRS transmission pattern unchanged) as in the example of FIG. 4 may for example be
  if the eNodeB implementation is using SRS for TX AP selection, then the UE decision to invert the SRS TX AP (i.e. to swap the antenna used for SRS transmission) will most likely cause the eNodeB to change the antenna to be used, too, giving rise to oscillations.
  if the eNodeB is using the SRS in TD-LTE for DL channel estimation, then there is no discontinuity in the estimation since the UE is always using the SRS TX AP.

It should be noted that when the network is deploying design choice 3 above (PH based TX AP selection), it regularly requests PH reports on the TX AP that it is not to be used (i.e. that it does not signal to be used). With the procedure of FIG. 3, the filtering prevents that the network probes cause the metric to exceed the threshold. Assuming a reasonable long response time is configured at the UE side, the network reacts faster on PH changes ensuring the coexistence with the procedure of FIG. 3. In that case, both the UE and the network are following the same objective and the procedure of FIG. 3 can be seen to impose neither benefit nor cost.

Further, it should be noted that when the network is not preferring a particular antenna, but instead is alternating between them on a TTI basis in order to generate diversity, the metric tends towards zero. Since the network is not preferring a particular antenna, it can be considered that there is no benefit in selecting the long-term best antenna at UE side.

The procedure of FIG. 1 can be implemented in the LTE base-band of the mobile terminal's cellular modem with low complexity. It ensures that the long-term best UE TX antenna is used regardless of the network implementation of CL-TAS. This allows:
  Better allocation of UL resources and, thus, improving the UE and system capacity,
  Longer UE battery lifetime, and
  Lower risk of service loss.

According to a further example, the network side may be allowed to avoid a detrimental transmission antenna selection, e.g. by an explicit signaling by the network (e.g. Radio Resource Control RRC signaling) for enabling or disabling TX AP selection for PUSCH within DCI0 when CL-TAS is configured. This way, the network may request TX AP toggling for SRS for enhancing the DL beamforming performance whereas the decision about the TX AP for PUSCH can be left to the UE implementation and the mobile terminal may for example follow the procedure of FIG. 3.

The UE may then autonomously select the TX AP for PUSCH. Since the DCI0 is then not used anymore for conveying the TX AP, i.e. the antenna selection mask is not applied to the scrambled CRC (cyclic redundancy check) this also reduces the risk of false positive DCIs on the PDCCH.

The signaling may for example be implemented by an extension of the 3GPP specification, e.g. by extending the field ue-TransmitAntennaSelection according to 3GPP with a Boolean field antennaSelectionMaskEnabled, which the mobile terminal 105 evaluates only when CL-TAS is signaled. If antennaSelectionMaskEnabled is true, the mobile terminal 105 applies the normal CL-TAS behavior. If antennaSelectionMaskEnabled is false, otherwise, the CL-TAS behavior is changed in that the mobile terminal 105 does not consider the UE transmit antenna selection mask within the DCI0 detection. Furthermore, the selection of the TX AP for PUSCH is left to the UE implementation.

It should be noted that the approaches described above may be used for a implementation as described by 3GPP OL-TAS as well as an UE vendor proprietary extension of TAS when 3GPP TAS is not configured. In these cases, for example, the input to the procedure of FIG. 3 is not the DCI0 but the most recent TX AP selected by the procedure itself.

Furthermore, it should be noted the approaches described above can be extended to be applied to cellular modems deploying more than two transmit antennas.

Figure 6:
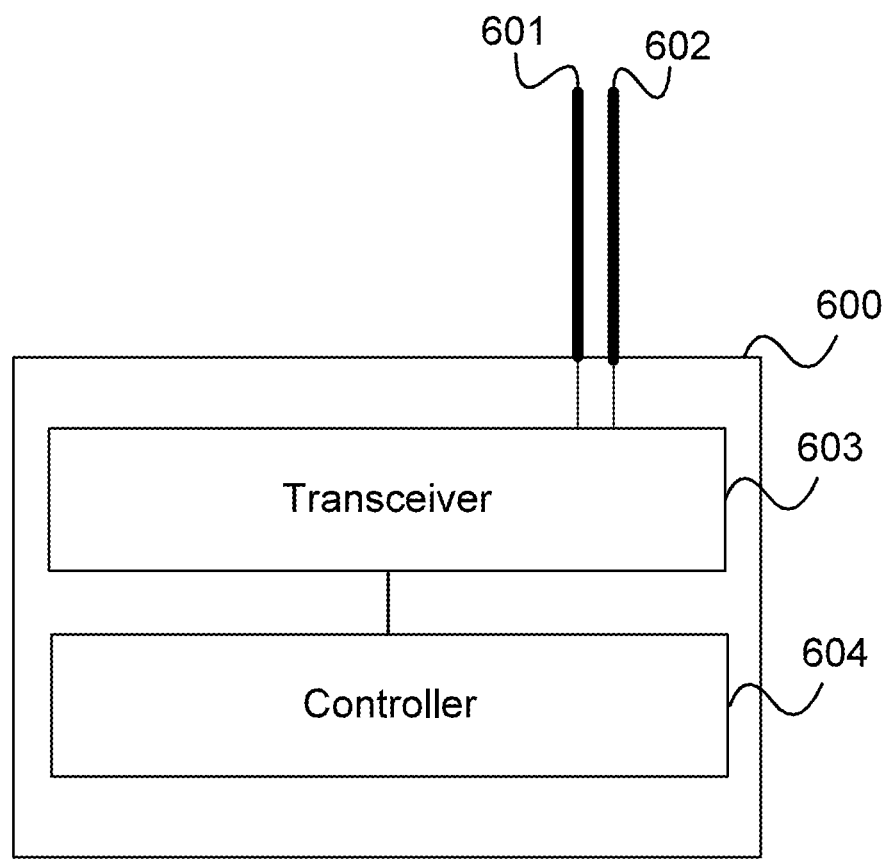
FIG. 6 shows a communication terminal.

In summary, according to various examples, a communication terminal as illustrated in FIG. 6 is provided.

FIG. 6 shows a communication terminal 600.

The communication terminal 600 includes a plurality of antennas 601, 602 and a transceiver 603 (e.g. including a transmitter and a receiver) configured to receive a message indicating a first antenna 601 of the plurality of antennas that the communication terminal is to use as transmission antenna;

The communication terminal further includes a controller 604 configured to determine whether a second antenna 602 of the plurality of antennas has, according to a predetermined performance measure, a higher transmission performance than the first antenna 601 and to control the transceiver 603 to use the second antenna 602 for transmission based on whether it has a higher transmission performance than the first antenna 601.

According to various examples, in other words, a communication terminal checks whether an antenna which the communication terminal is requested to use for transmission (e.g. indicated by a control message from the network side of a cellular communication network) has a lower performance than another antenna of the communication terminal and, if this is the case, overrules the request and uses the other antenna instead.

The transmission is for example a transmission of data, e.g. a transmission of user data or useful data (e.g. in contrast to a reference signal) which may also include a transmission of control data. For example, the transmission includes a PUSCH transmission or a PUCCH transmission or both.

The components of the communication terminal (e.g. the transceiver and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 7:
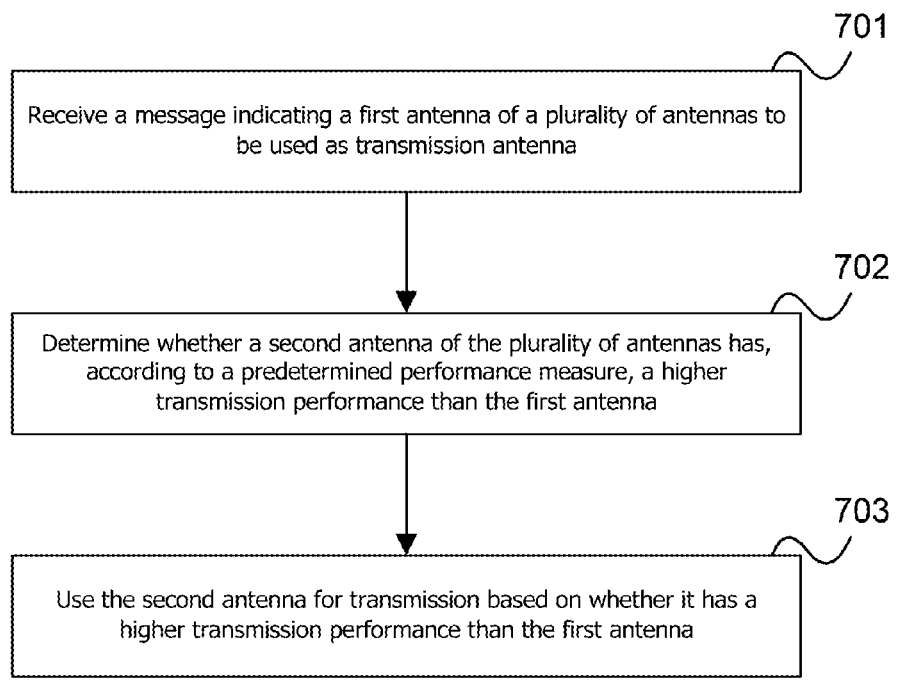
FIG. 7 shows a flow diagram illustrating a method for selecting a transmission antenna.

The communication terminal 600 for example carries out a method as illustrated in FIG. 7.

FIG. 7 shows a flow diagram 700 illustrating a method for selecting a transmission antenna, for example carried out by a communication terminal.

In 701, the communication terminal receives a message indicating a first antenna of a plurality of antennas to be used as transmission antenna.

In 702, the communication terminal determines whether a second antenna of the plurality of antennas has, according to a predetermined performance measure, a higher transmission performance than the first antenna.

In 703, the communication terminal uses the second antenna for transmission based on whether it has a higher transmission performance than the first antenna.

The following examples pertain to further embodiments.

Example 1 is a communication terminal as illustrated in FIG. 6.

In Example 2, the subject matter of Example 1 may optionally include the controller being configured to control the transceiver to use the second antenna for transmission if it has a higher transmission performance than the first antenna by a predetermined margin.

In Example 3, the subject matter of any one of Examples 1-2 may optionally include the transceiver being configured to receive the message from another communication device.

In Example 4, the subject matter of any one of Examples 1-3 may optionally include the communication terminal being a subscriber terminal of a cellular mobile communication network and the transceiver being configured to receive the message from a network component of the cellular mobile communication network.

In Example 5, the subject matter of any one of Examples 1-4 may optionally include the communication terminal being a subscriber terminal of a cellular mobile communication network and the transceiver being configured to receive the message from a base station of the cellular mobile communication network.

In Example 6, the subject matter of any one of Examples 1-5 may optionally include the message being an antenna signaling message according to closed loop transmit antenna selection.

In Example 7, the subject matter of any one of Examples 1-6 may optionally include the message being a downlink control information message.

In Example 8, the subject matter of any one of Examples 1-7 may optionally include the controller being configured to, if it controls the transceiver to use the second antenna for transmission, control the transceiver to use the second antenna for the transmission of a reference signal scheduled for the first antenna.

In Example 9, the subject matter of any one of Examples 1-8 may optionally include the controller being further configured to, if it controls the transceiver to use the second antenna for transmission, control the transceiver to use the first antenna for the transmission of a reference signal scheduled for the second antenna.

In Example 10, the subject matter of any one of Examples 1-9 may optionally include the controller being further configured to, if it controls the transceiver to use the second antenna for transmission, control the transceiver to keep the first antenna for the transmission of a reference signal scheduled for the first antenna and to keep the second antenna for the transmission of a reference signal scheduled for the second antenna.

In Example 11, the subject matter of any one of Examples 8-10 may optionally include the reference signal being a reference signal for uplink channel quality estimation.

In Example 12, the subject matter of any one of Examples 1-11 may optionally include the performance measure including a comparison of the transmission performance of the first antenna with the transmission performance of the second antenna over a predetermined time interval.

In Example 13, the subject matter of any one of Examples 1-12 may optionally include the performance measure being based on values which represent the transmission performance of the first antenna and the second antenna and which are filtered over time.

In Example 14, the subject matter of any one of Examples 1-13 may optionally include the transmission performance being the power headroom.

In Example 15, the subject matter of any one of Examples 1-14 may optionally include the transceiver being configured to receive a further message indicating that the communication terminal is allowed to use a different antenna for transmission than the first antenna and the controller being configured to control the transceiver to use the second antenna for transmission based on the reception of the further message.

In Example 16, the subject matter of Example 15 may optionally include the controller being configured to control the transceiver to use the second antenna for transmission if the transceiver has received the further message.

Example 17 is a method for selecting a transmission antenna as illustrated in FIG. 7.

In Example 18, the subject matter of Example 17 may optionally include using the second antenna for transmission if it has a higher transmission performance than the first antenna by a predetermined margin.

In Example 19, the subject matter of any one of Examples 17-18 may optionally include receiving the message from another communication device.

In Example 20, the subject matter of any one of Examples 17-21 may optionally include being performed by a subscriber terminal of a cellular mobile communication network and may optionally include receiving the message from a network component of the cellular mobile communication network.

In Example 21, the subject matter of any one of Examples 17 may optionally include being performed by a subscriber terminal of a cellular mobile communication network and may optionally include receiving the message from a base station of the cellular mobile communication network.

In Example 22, the subject matter of any one of Examples 17-21 may optionally include the message being an antenna signaling message according to closed loop transmit antenna selection.

In Example 23, the subject matter of any one of Examples 17-22 may optionally include the message being a downlink control information message.

In Example 24, the subject matter of any one of Examples 17-23 may optionally include, if the second antenna being used for transmission, using the second antenna for the transmission of a reference signal scheduled for the first antenna.

In Example 25, the subject matter of any one of Examples 17-24 may optionally include, if the second antenna being used for transmission, using the first antenna for the transmission of a reference signal scheduled for the second antenna.

In Example 26, the subject matter of any one of Examples 17-25 may optionally include, if the second antenna being used for transmission, keeping the first antenna for the transmission of a reference signal scheduled for the first antenna and keeping the second antenna for the transmission of a reference signal scheduled for the second antenna.

In Example 27, the subject matter of Example 26 may optionally include the reference signal being a reference signal for uplink channel quality estimation.

In Example 28, the subject matter of any one of Examples 17-27 may optionally include the performance measure including a comparison of the transmission performance of the first antenna with the transmission performance of the second antenna over a predetermined time interval.

In Example 29, the subject matter of any one of Examples 17-28 may optionally include the performance measure being based on values which represent the transmission performance of the first antenna and the second antenna and which are filtered over time.

In Example 30, the subject matter of any one of Examples 17-29 may optionally include the transmission performance being the power headroom.

In Example 31, the subject matter of any one of Examples 17-30 may optionally include receiving a further message indicating that the communication terminal is allowed to use a different antenna for transmission than the first antenna and using the second antenna for transmission based on the reception of the further message.

In Example 32, the subject matter of Example 31 may optionally include using the second antenna for transmission if the further message has been received.

Example 33 is a computer readable medium having recorded instructions thereon which, when executed by a processor, make the processor perform a method for selecting a transmission antenna according to any one of Examples 17 to 32.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
   a plurality of antennas;
   a transceiver configured to receive a message indicating that a first antenna of the plurality of antennas is to be used as a transmission antenna by the communication terminal in accordance with an antenna assignment established via a communication protocol; and
   a controller configured to control the transceiver, and to compare a first transmission performance of the first antenna with a second transmission performance of a second antenna of the plurality of antennas according to a predetermined performance measure, and to cause the transceiver to (i) use the first antenna as the transmission antenna in compliance with the antenna assignment established via the communication protocol when the first transmission performance is greater than the second transmission performance, and (ii) override the antenna assignment established via the communication protocol and use the second antenna as the transmission antenna when the second transmission performance is greater than the first transmission performance,
   wherein the first transmission performance and the second transmission performance are measured in terms of power headroom measurements such that lower power headroom measurements correlate to lower transmission performance.

2. The communication terminal of claim 1, wherein the controller is configured to cause the transceiver to use the second antenna as the transmission antenna if the second transmission performance is higher than the first transmission performance by a predetermined margin.

3. The communication terminal of claim 1, wherein the communication terminal is a subscriber terminal of a cellular mobile communication network, and
   wherein the transceiver is configured to receive the message from a network component of the cellular mobile communication network.

4. The communication terminal of claim 1, wherein the communication terminal is a subscriber terminal of a cellular mobile communication network, and wherein the transceiver is configured to receive the message from a base station of the cellular mobile communication network.

5. The communication terminal of claim 1, wherein the message is an antenna signaling message according to a closed loop transmit antenna selection (CL-TAS) scheme in accordance with the communication protocol.

6. The communication terminal of claim 1, wherein the message is a downlink control information message in accordance with the communication protocol.

7. The communication terminal of claim 1, wherein the controller is configured to, if the controller causes the transceiver to use the second antenna as the transmission antenna, cause the transceiver to use the second antenna for transmission of a reference signal scheduled for the first antenna in accordance with the communication protocol.

8. The communication terminal of claim 1, wherein the controller is further configured to, if the controller causes the transceiver to use the first antenna as the transmission antenna, cause the transceiver to use the first antenna for the transmission of a reference signal scheduled for the second antenna in accordance with the communication protocol.

9. The communication terminal of claim 1, wherein the controller is further configured to, if the controller causes the transceiver to use the second antenna as the transmission antenna, (i) keep the first antenna for the transmission of a reference signal scheduled for the first antenna in accordance with the communication protocol, and (ii) keep the second antenna for the transmission of the reference signal scheduled for the second antenna in accordance with the communication protocol.

10. The communication terminal of claim 7, wherein the reference signal is a signal associated with uplink channel quality estimation in accordance with the communication protocol.

11. The communication terminal of claim 1, wherein the predetermined performance measure includes a comparison of a transmission performance of the first antenna with a transmission performance of the second antenna over a predetermined time interval.

12. The communication terminal of claim 1, wherein the controller is further configured to compare the first transmission performance of the first antenna with a second transmission performance of the second antenna based on values which represent the first transmission performance and the second transmission performance that are filtered over time.

13. The communication terminal of claim 1, wherein the transceiver is configured to receive a second message indicating that the communication terminal is allowed to use a different antenna as the transmission antenna than the first antenna, and
wherein the controller is configured to cause the transceiver to use the second antenna as the transmission antenna based on the reception of the second message.

14. The communication terminal of claim 13, wherein the controller is configured to cause the transceiver to use the second antenna as the transmission antenna only if the transceiver receives the second message.

15. The communication terminal of claim 1, wherein the antenna assignment established via the communication protocol includes an alternating assignment among the first antenna and the second antenna for transmission of a sounding reference signal (SRS) in accordance with a predetermined transmission pattern.

16. A method for selecting a transmission antenna comprising:
receiving a message indicating that a first antenna of a plurality of antennas is to be used as the transmission antenna in accordance with an antenna assignment established via a communication protocol;
comparing a first transmission performance of the first antenna with a second transmission performance of a second antenna of the plurality of antennas according to a predetermined performance measure; and
using (i) the first antenna as the transmission antenna in compliance with the antenna assignment established via the communication protocol when the first transmission performance is greater than the second transmission performance, and (ii) the second antenna for transmission by overriding the antenna assignment established via the communication protocol when the second transmission performance is greater than the first transmission performance,
wherein the first transmission performance and the second transmission performance are measured in terms of power headroom measurements such that lower power headroom measurements correlate to lower transmission performance.

17. The method of claim 16, wherein the message is one of (i) an antenna signaling message according to a closed loop transmit antenna selection (CL-TAS) scheme in accordance with the communication protocol, or (ii) a downlink control information message in accordance with the communication protocol.

18. The method of claim 16, further comprising:
when using the second antenna as the transmission antenna, using the second antenna for transmission of a reference signal scheduled for the first antenna in accordance with the communication protocol, wherein the reference signal is a signal associated with uplink channel quality estimation in accordance with the communication protocol.

19. A non-transitory computer readable medium having recorded instructions thereon which, when executed by a processor, cause the processor to:
receive a message indicating a first antenna of a plurality of antennas is to be used as the transmission antenna in accordance with an antenna assignment established via a communication protocol;
compare a first transmission performance of the first antenna with a second transmission performance of a second antenna of the plurality of antennas according to a predetermined performance measure; and
using (i) the first antenna as the transmission antenna in compliance with antenna assignment established via the communication protocol when the first transmission performance is greater than the second transmission performance, and (ii) the second antenna for transmission by overriding the antenna assignment established via the communication protocol when the second transmission performance is greater than the first transmission performance,
wherein the first transmission performance and the second transmission performance are measured in terms of power headroom measurements such that lower power headroom measurements correlate to lower transmission performance.

20. The non-transitory computer readable medium of claim 19, wherein the message is one of (i) an antenna signaling message according to a closed loop transmit antenna selection (CL-TAS) scheme in accordance with the communication protocol, or (ii) a downlink control information message in accordance with the communication protocol.

\* \* \* \* \*